United States Patent
Larsen et al.

(10) Patent No.: US 8,043,452 B2
(45) Date of Patent: Oct. 25, 2011

(54) MULTIFUNCTIONAL ELECTROMAGNETIC SHIELDING

(75) Inventors: Ty A. Larsen, Everett, WA (US); Terrance L. Thomas, Covington, WA (US); John T. Paterson, Mukilteo, WA (US); Henry V. Fletcher, Everett, WA (US)

(73) Assignee: The Boeing Company, Chicago, IL (US)

(*) Notice: Subject to any disclaimer, the term of this patent is extended or adjusted under 35 U.S.C. 154(b) by 446 days.

(21) Appl. No.: 11/933,813

(22) Filed: Nov. 1, 2007

(65) Prior Publication Data

US 2009/0117322 A1    May 7, 2009

(51) Int. Cl.
  *B32B 37/16* (2006.01)
  *B32B 37/20* (2006.01)
(52) U.S. Cl. .......................... 156/71; 156/192; 181/207
(58) Field of Classification Search ............... 156/60, 156/191, 192, 71; 181/207, 208; 428/309.9, 428/609; 174/391, 393, 350
See application file for complete search history.

(56) References Cited

U.S. PATENT DOCUMENTS

| | | | | |
|---|---|---|---|---|
| 3,193,049 | A | * | 7/1965 | Wollek .................... 181/208 |
| 3,576,556 | A | * | 4/1971 | Sellors, Jr. ............... 340/579 |
| 4,347,901 | A | * | 9/1982 | Wilhoit ..................... 169/62 |
| 4,686,127 | A | * | 8/1987 | Burns et al. ............. 428/40.7 |
| 4,884,171 | A | | 11/1989 | Maserang et al. |
| 4,960,009 | A | * | 10/1990 | Schultz et al. .......... 74/473.29 |
| 5,126,185 | A | | 6/1992 | Forrest et al. |
| 5,184,141 | A | * | 2/1993 | Connolly et al. ......... 343/705 |
| 5,670,742 | A | | 9/1997 | Jones |
| 5,985,362 | A | * | 11/1999 | Specht et al. ............. 427/236 |
| 6,406,601 | B1 | * | 6/2002 | Kim et al. ............ 204/298.26 |
| 6,787,204 | B2 | | 9/2004 | Chaussade et al. |
| 7,176,387 | B1 | * | 2/2007 | Huang ..................... 174/393 |
| 7,721,844 | B1 | * | 5/2010 | Lewis et al. .............. 181/207 |

* cited by examiner

*Primary Examiner* — Katarzyna Wyrozebski Lee
*Assistant Examiner* — Scott W Dodds
(74) *Attorney, Agent, or Firm* — Armstrong Teasdale LLP (57) ABSTRACT

A method of manufacturing a multifunctional shielding mat for an interior of a vehicle is provided. The method includes providing at least one sheet of dampening material, coupling at least one sheet of electromagnetic shielding material to the at least one sheet of dampening material, and configuring the multifunctional shielding mat to cover a predetermined area of the vehicle.

10 Claims, 6 Drawing Sheets

MULTIFUNCTIONAL ELECTROMAGNETIC SHIELDING

BACKGROUND OF THE INVENTION

This invention relates generally to aircraft component insulating methods incorporating electromagnetic shielding, and more specifically to insulation of carbon fiber reinforced plastic (CFRP) aircraft components.

Aerospace vehicles depend heavily upon electronic systems and thus must be shielded against electromagnetic interference (EMI). EMI interference may come in the form of lighting strikes, interference from radio emitters, nuclear electromagnetic pulses (EMP), and high power microwave (HPM) threats.

Aluminum hull aircraft are shielded from high-intensity radiated fields (HIRF)/lightning effects by virtue of their metallic construction. Manufacturing an aircraft from CFRP provides benefits such as reduced weight and reduced manufacturing costs. However, CFRP does not provide the same shielding capabilities that are inherent in aluminum hull aircraft.

BRIEF DESCRIPTION OF THE INVENTION

In one embodiment, a method of manufacturing a multifunctional shielding mat for an interior of a vehicle is described. The method includes providing at least one sheet of dampening material, coupling at least one sheet of electromagnetic shielding material to the at least one sheet of dampening material, and configuring the multifunctional shielding mat to cover a predetermined area of the vehicle.

In another embodiment, a multifunctional mat for use in combination with a composite fiber vehicle component is described. The multifunctional mat includes at least one sheet of vibration dampening material and at least one sheet of shield material coupled to the vibration dampening material to form the multifunctional mat. The shield material is configured to shield an interior of a vehicle from electromagnetic radiation.

In another embodiment, a method of shielding an interior of a vehicle from at least one of electromagnetic radiation and vibration is described. The method includes providing at least one sheet of vibration dampening material. The method further includes coupling at least one sheet of electromagnetic shielding material to the at least one sheet of vibration dampening material to form a multifunctional mat. The method still further includes coupling the multifunctional mat to a predetermined area of the vehicle.

In yet another embodiment, an aircraft is described. The aircraft includes composite fiber structural components and at least one multifunctional mat coupled to a predetermined area of the structural components, the multifunctional mat configured to shield an interior of the aircraft from electromagnetic radiation.

DETAILED DESCRIPTION OF THE INVENTION

Figure 1:
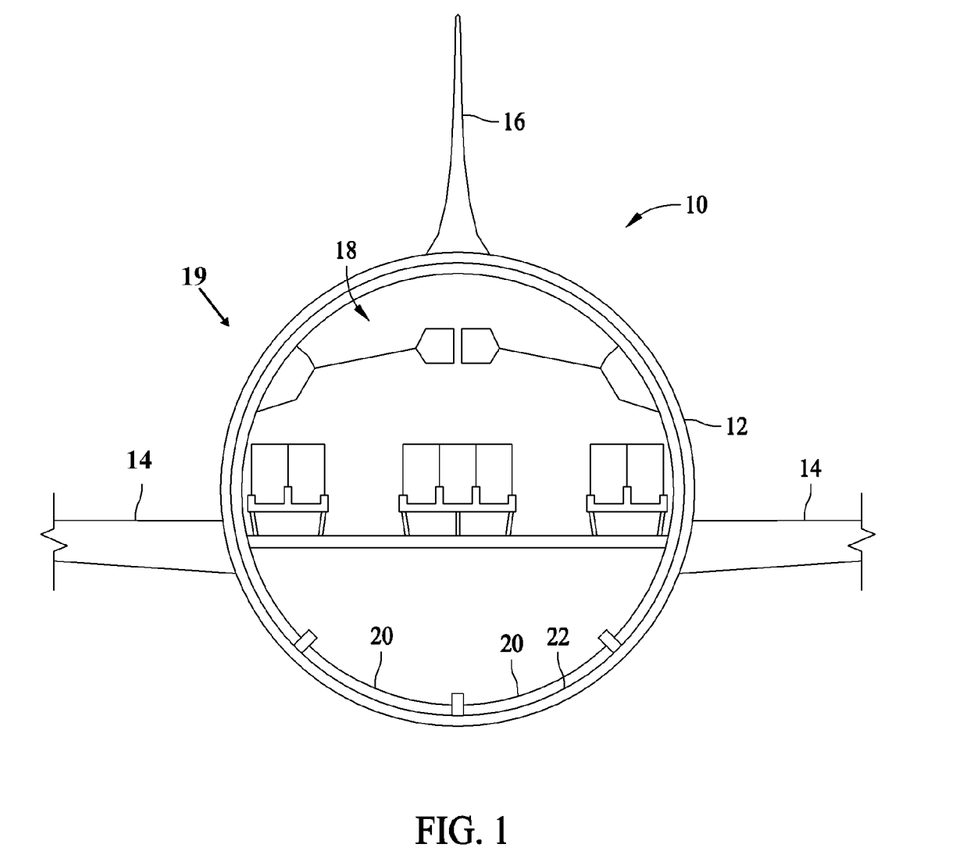
FIG. 1 is a partial cross-sectional view of a known aircraft.

FIG. 1 is a partial cross-sectional view of a known aircraft 10. Aircraft 10 includes a fuselage 12, a pair of wings 14, and a vertical tail fin 16. Typically, portions of the fuselage 12, wings 14, and vertical tail fin 16 are manufactured from a metal or metallic alloy, for example, aluminum or an aluminum alloy. Aluminum and other metals shield an interior 18 of aircraft 10 from high-intensity radiated fields (HIRF) and lightning effects that may be present at an exterior 19 of aircraft 10. HIRFs result from the transmission of electromagnetic energy from radar, radio, television, and other ground-based, shipborne, or airborne radio frequency (RF) transmitters. Flight-critical electronic controls, electronic displays, and electronic engine controls, such as those used in military and commercial aircraft may be susceptible to adverse effects if operated in a HIRF environment.

Known aircraft configurations may include sound dampening and thermal insulation linings 20 positioned, for example, along an interior surface 22 of the aircraft fuselage 12. These linings may increase the comfort level of interior 18 for crew and passengers and/or may protect various components within interior 18 from damage caused by exposure to extreme temperatures, such as the low temperatures present at high altitudes.

Figure 2:
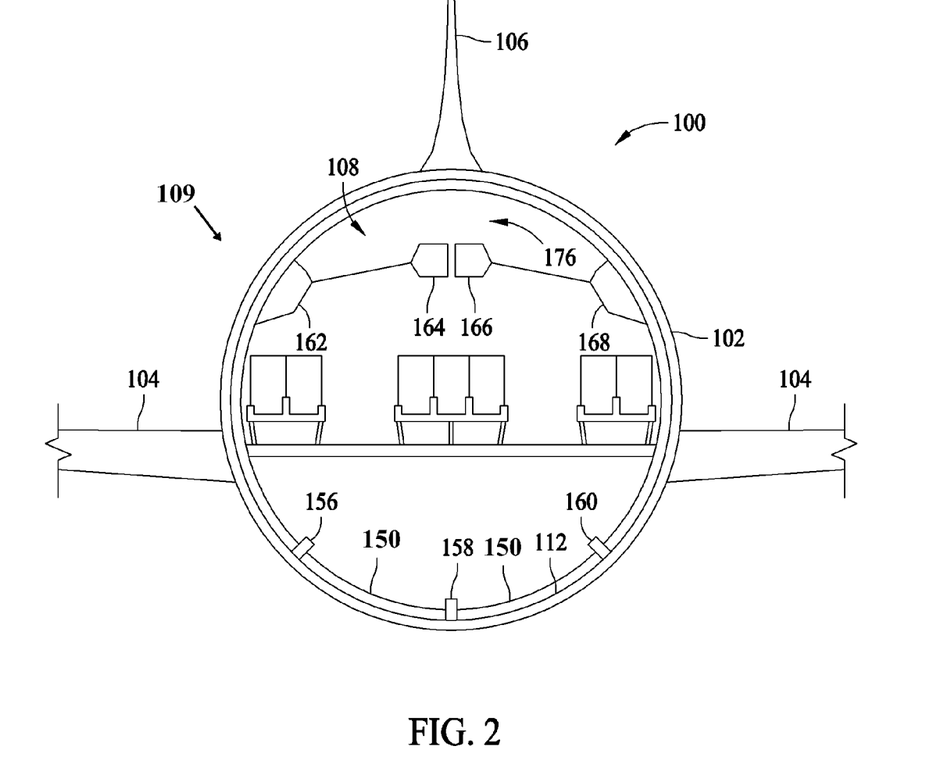
FIG. 2 is a partial cross-sectional view of one embodiment of an aircraft.

Recently, there has been interest in the development of aircraft structural components manufactured from composite fiber materials. FIG. 2 is a partial cross-sectional view of one embodiment of an aircraft 100. Aircraft 100 includes a fuselage 102, a pair of wings 104, and a vertical tail fin 106. At least a portion of fuselage 102, wings 104, and vertical tail fin 106 are manufactured from a composite fiber, for example but not limited to, a carbon fiber reinforced plastic (CFRP). Additional components may also be manufactured from composite fiber. Also, components may be manufactured from a combination of metal and composite fiber materials and also from materials that include various percentages of composite fiber material.

CFRP components do not inherently provide the same shielding from HIRFs and lightning effects as aluminum and other metallic components. Therefore, to protect sensitive electronics within an interior 108, shielding is added to the CFRP components. Known shielding methods in use on CFRP aircraft include conductive grids/sheets that attenuate HIRF and lightning effects. Such methods may also rely on the inherent conductivity of the carbon fibers in the CFRP. These methods may effectively shield an interior 108 of aircraft 100 from high frequency electromagnetic (EM) radiation at an exterior 109 of aircraft 100, for example, EM radiation in the megahertz to gigahertz frequency range, as well as conducting away the currents that are expected from events such as lightning strikes. However, these methods may not effectively shield interior 108 from low frequency EM radiation, for example, EM radiation in the hertz to kilohertz frequency range. Manufacturing of known shielding methods for utilization with CFRP components is challenging, due to the effectiveness of the shielding being based in part on continuous, low resistance contacts being made and maintained between all components.

Figure 3:
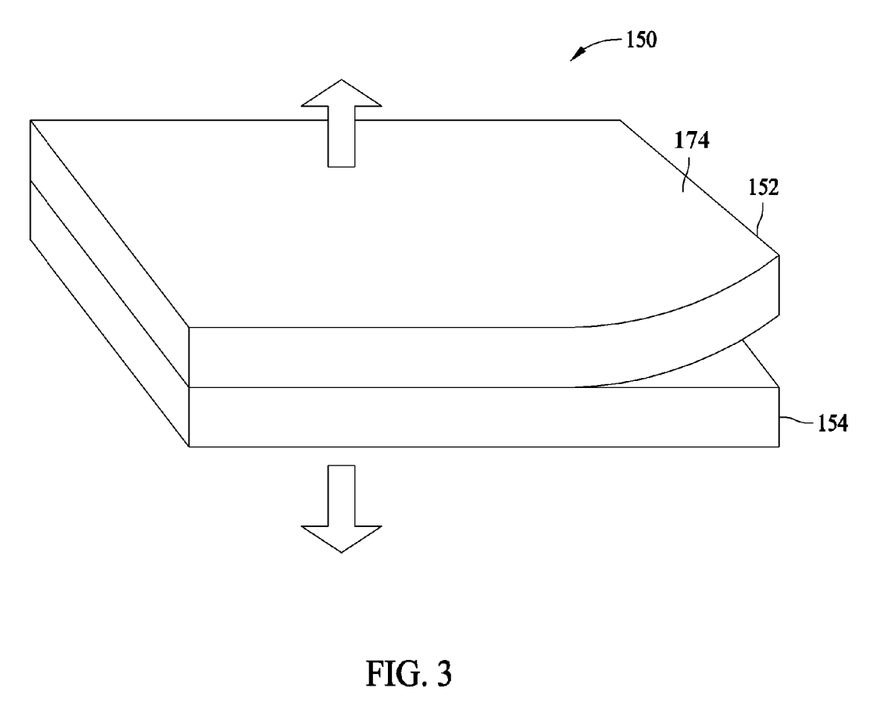
FIG. 3 is a diagram of a multifunctional mat that includes a dampener layer and an absorption/shielding material.

FIG. 3 is a diagram of a multifunctional mat 150 that includes a vibration dampener layer 152 and a low frequency shielding material 154. Multifunctional mat 150 may be a flexible mat that is formed in any shape or size. In the exemplary embodiment, interior surface 112 of aircraft fuselage 102 (shown in FIG. 2) is lined with multifunctional mat 150. In alternative embodiments, other components of aircraft 100 are lined with multifunctional mat 150, such as, but not limited to, wings 104 and vertical tail fin 106.

In an example embodiment, vibration dampener layer 152 is configured to dampen vibrations of the material on which multifunctional mat 150 is coupled. Vibration dampener layer 152 may also be configured to dampen sounds, insulating interior 108 of aircraft 100 from a level of noise that may be present at exterior 109 of aircraft 100.

Shielding material 154 may be tailored to absorb a specific range of electromagnetic frequencies and/or shield interior 108 from a specific range of electromagnetic frequencies. Tailoring may be achieved by, but is not limited to, varying the materials used and/or the thickness of the materials.

In addition to being positioned along interior surface 112, multifunctional mat 150 may also be included in interior structures of aircraft 100, such as, but not limited to, overhead baggage compartments 162, 164, 166, and 168 (shown in FIG. 2). More specifically, any surface of the interior structures of aircraft 100 may be lined with multifunctional mat 150. Additionally, components of interior structures of aircraft 100 may be manufactured to include shielding, such as, but not limited to, vibration dampener layer 152 and shielding material 154.

In the exemplary embodiment, to assemble multifunctional mat 150, vibration dampener layer 152 is coupled to shielding material 154. Vibration dampener layer 152 may be coupled to shielding material 154 with an adhesive, fasteners, or any other known method of coupling materials. Multifunctional mat 150 is then rolled onto a core (not shown) for storage and transport, before being unrolled and positioned as desired within aircraft 100. Multifunctional mat 150 is configured to be unrolled and adhesively coupled to interior surface 112 of fuselage 102 between reinforcing ribs 156, 158, and 160 (shown in FIG. 2).

In alternative embodiments, in addition to unrolling multifunctional mat 150 from a core, the multifunctional mat 150 may also be configured to conform to a predetermined surface. Multifunctional mat 150 may also be installed by painting, a flame spray coating, and any other assembly method that provides proper coverage of the aircraft surface and allows multifunctional mat 150 to function as described herein. Dampener layer 152 may include an adhesive coating on a surface 174, which may also be referred to as an adhesive layer, to facilitate coupling of multifunctional mat 150 to interior surface 112. Alternatively, any method of coupling may be used to couple multifunctional mat 150 to interior surface 112 including, but not limited to, an epoxy, fasteners, and a thermal bond.

When used within an aluminum shelled aircraft, known insulation mats, for example, insulation lining 20, can provide vibration insulation, sound insulation, thermal insulation, and fire protection. When used within a CFRP shelled aircraft, known insulation mats provide some sound insulation and possibly fire protection, but do not provide thermal management benefits. Multifunctional mat 150 may be installed in aircraft 100 in similar locations within an aircraft as linings, such as insulation lining 20, have typically been installed. However, unlike insulation lining 20, multifunctional mat 150 is configured to function in cooperation with the CFRP shell.

In one specific embodiment, dampener layer 152 is a viscoelastic vibration dampening material. Dampener layer 152 is positioned adjacent to fuselage 102. Dampener layer 152 absorbs vibrations to reduce a noise level within interior 108 of aircraft 100. As stated above, dampener layer 152 may also include adhesive layer 174. In an exemplary embodiment, adhesive layer 174 couples multifunctional mat 150 to interior surface 112 of aircraft fuselage 102 (shown in FIG. 2). In such an embodiment, to reduce weight as compared to a solid layer of material, dampener layer 152 may be formed from viscoelastic tape oriented to form a grid, rounded/perforated construction, or any other type of construction geometry that enables dampener layer 152 to function as described. An example of viscoelastic tape is produced by 3M Corp. of St. Paul, Minn. In another exemplary embodiment, a solid sheet of material is perforated and material is removed to reduce weight while maintaining vibration absorbing characteristics.

As stated above, CFRP is effective at conducting away high frequency currents, primarily due to the conductivity of the carbon fibers. Shielding material 154 has a high magnetic permeability. Examples of shielding material 154 include, but are not limited to, AMPB-65 and mu-metal, which is available from MuShield Company of Londonderry, N.H. Multifunctional mat 150 may be heavier than known insulation mats, however, the additional weight may be offset by combining low frequency absorption material 154 with dampener layer 152 and replacing known aircraft linings, for example, but not limited to, insulation lining 22 (shown in FIG. 1).

Unlike installation of conductive grids/sheets, installation of multifunctional mat 150 does not require that components be coupled by low resistance contacts. Not requiring low resistance contacts between components allows additional material to be added to previously installed material without having to ensure low resistance contacts are formed between the materials. As described above, multifunctional mat 150 also enables tailored shielding. An example of tailored shielding would be positioning a thicker, and therefore heavier multifunctional mat 150 around panels nearest aircraft windows (not shown), which would provide a higher level of shielding. A thinner, lighter weight multifunctional mat 150 may be positioned in overhead areas, for example, an overhead area 176 (shown in FIG. 2), where in combination with supplemental shielding protection of enhanced plastic components (e.g., overhead baggage compartments 162, 164, 166, and 168), effective shielding is provided.

In yet another embodiment, shielding material 154 may be formed from a plurality of woven magnetic wires (not shown in FIG. 3) and/or by impregnating adhesives, for example adhesive layer 174, with particulates having tailored shielding effects.

Figure 4:
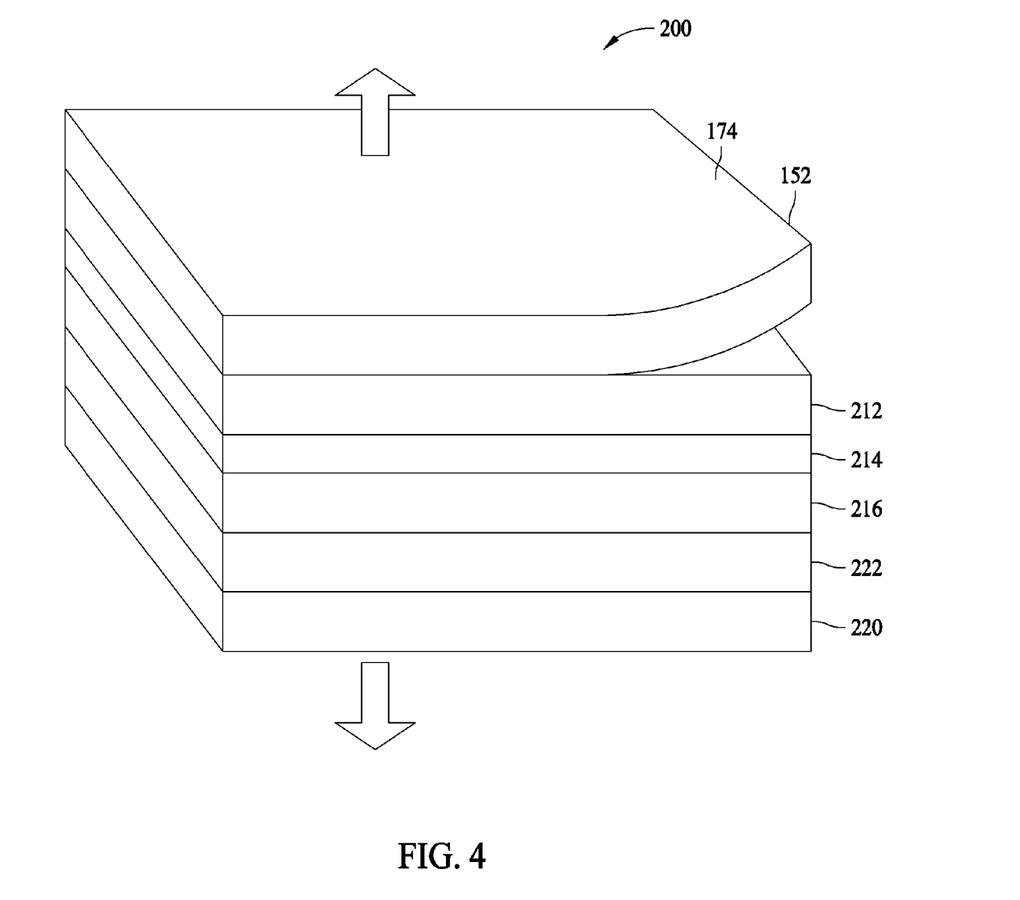
FIG. 4 illustrates an alternative embodiment of a multifunctional mat.

FIG. 4 is an embodiment of a multifunctional mat 200. Layers that are similar in FIG. 3 and FIG. 4 are identified with the same reference numerals. Multifunctional mat 200 includes vibration dampener layer 152, a metallic constraining layer 212, a structural layer 214, a first low frequency shield layer 216, and a second low frequency shield layer 220.

Dampener layer 152 is a viscoelastic vibration dampening material that is positioned adjacent to interior surface 112 of fuselage 102 (shown in FIG. 1) and is described above. Dampener layer 152 absorbs vibrations to reduce a noise level within interior 108 of aircraft 100. Dampener layer 152 may also include an adhesive layer 174. Adhesive layer 174 couples multifunctional mat 200 to, for example, interior surface 112 of aircraft 100.

Metallic constraining layer 212 functions with dampener layer 152 to provide sound dampening. Metallic constraining layer 212 also provides an electrically conductive sheet to provide additional EM shielding. In an exemplary embodiment, constraining layer 212 is rigid, and in combination with vibration dampener layer 152, improves sound dampening performance over a multifunctional mat 200 having only non-rigid layers.

Multifunctional mat 200 includes first shielding layer 216 and second shielding layer 220. However, multifunctional mat 200 may include any number of shielding layers so long as the shielding layers enable multifunctional mat 200 to function, and be tailored, as described herein. In an example embodiment, first and second low shielding layers 216 and 220 are adhesively coupled together by an adhesive layer 222.

Figure 5:
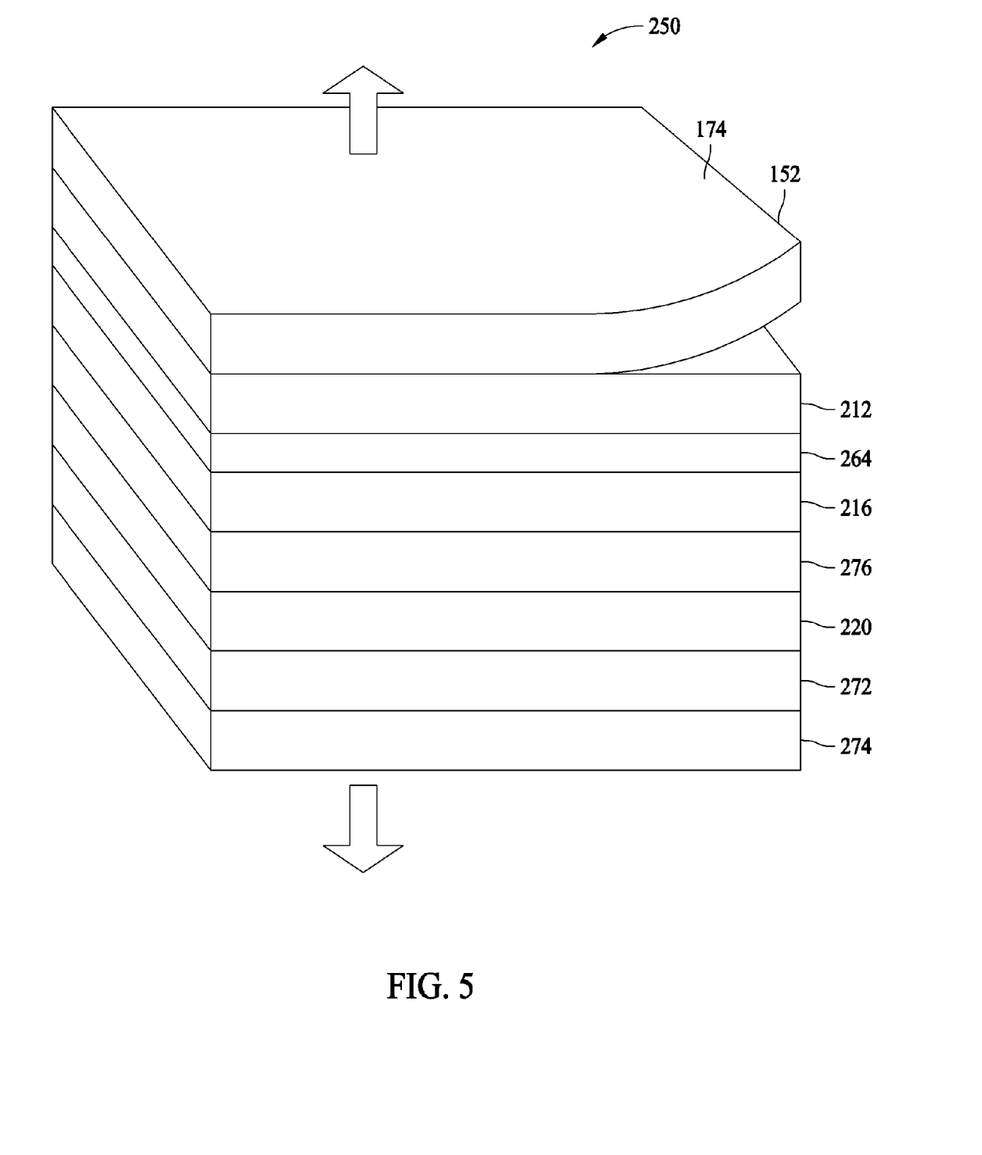
FIG. 5 illustrates another alternative embodiment of a multifunctional mat.

FIG. 5 is another embodiment of a multifunctional mat 250. Layers that are similar in FIG. 4 and FIG. 5 are identified with the same reference numerals. Multifunctional mat 250 includes vibration dampener layer 152, metallic constraining layer 212, a structural layer 264, first low frequency shield layer 216, second low frequency shield layer 220, a high frequency shield grid 272, and a high frequency absorption layer 274.

Dampener layer 152 is a viscoelastic vibration dampening material that is positioned adjacent to fuselage 102 and is described above. Dampener layer 152 may also include an adhesive layer 174. In an exemplary embodiment, adhesive layer 174 couples multifunctional mat 250 to interior surface 112 of aircraft 100.

Metallic constraining layer 212 functions with dampener layer 152 to provide sound dampening. Metallic constraining layer 212 also provides an electrically conductive sheet to provide additional high frequency EM shielding.

Multifunctional mat 250 includes first low frequency shield layer 216 and second low frequency shield layer 220. However, multifunctional mat 250 may include any number of low frequency shield layers that enable multifunctional mat 250 to function as described herein. First and second low frequency shield layers 216 and 220 are adhesively coupled together by an adhesive layer 276.

As described above with respect to low frequency absorption material 154, low frequency shield layers 216 and 220 have a high magnetic permeability. Rather than operating as a conducting/reflective shield, such as the aluminum skin of known aircraft, layers 216 and 220 absorb low frequency EM radiation. The absorbed EM radiation is converted into heat.

Multifunctional mat 250 also includes high frequency shield grid 272 and high frequency absorption layer 274. Shield grid 272 and absorption layer 274 reduce interior cabin wireless reflections. Although other layers within multifunctional mat 250 may be inherently thermally insulative, an additional thermally insulative layer (not shown in FIG. 5) may be adhesively coupled to multifunctional mat 250, and/or at least one layer within multifunctional mat 250 may further be configured to specifically provide thermal insulation.

Figure 6:
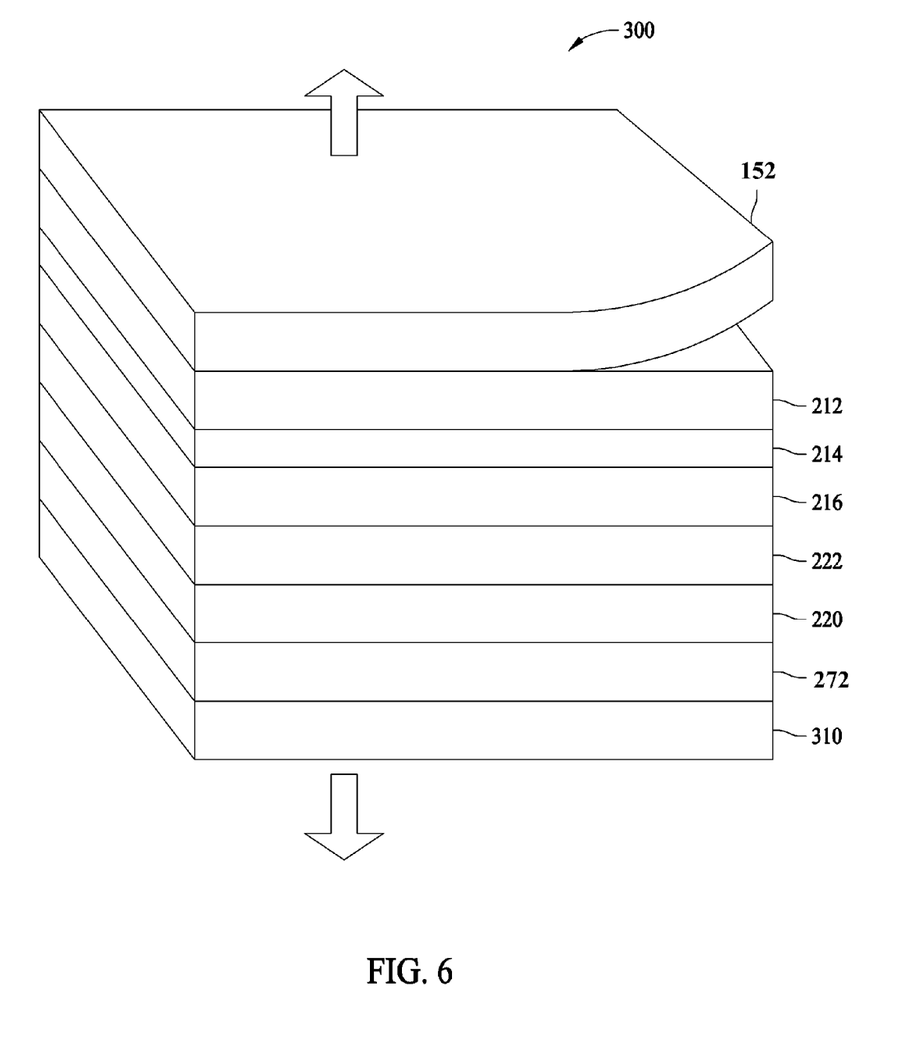
FIG. 6 illustrates an alternative embodiment of a multifunctional mat that includes a sensor circuit layer.

FIG. 6 is an embodiment of a multifunctional mat 300 that includes a sensor circuit layer 310. Multifunctional mat 300 is similar to multifunctional mat 250 (shown in FIG. 5) and components that are the same in FIGS. 4 and 5 are identified with the same reference numerals.

Thin film techniques are used to add sensor circuit layer 310 to multifunctional mat 300. Sensor circuit layer 310 is shown as being positioned on an outer surface of multifunctional mat 300 furthest from interior surface 112 of aircraft 100 (shown in FIG. 1). However, layer 310 can be positioned anywhere within multifunctional mat 300. Sensor circuit layer 310 includes, for example, but is not limited to, a flame sensor (not shown in FIG. 6). The flame sensor detects at least one of a temperature, the presence of smoke, and the presence of flames. Sensor circuit layer 310 also provides an alert, for example, should an interior lining fire occur or if the temperature within an interior lining surpasses a preset threshold. Sensor layer 310 also provides information to pilots in emergency situations, by identifying "hot spots" and/or where insulation layers are breaking down. Sensor circuit layer 310 may also include wires to electronically coupled layer 310 to aircraft computer systems (not shown in FIG. 6). Sensor circuit layer 310 may also be coupled to aircraft computer systems wirelessly.

Multifunctional mats 150, 200, 250, and 300 combine a shielding technique into other common components of an aircraft. The EM shields are integrated into other common aircraft components, such as, but not limited to, mats, linings, and baggage compartments, without requiring additional labor to ensure shielding connectivity. Multifunctional mats 150, 200, 250, and 300 may provide a net weight savings to the aircraft while reducing manufacturing complexity. Replacement of current aircraft insulation mats reduces aircraft weight while minimally affecting aircraft performance since current aircraft insulation mats perform very little of their original function when used in a CFRP aircraft. The multifunctional mat allows for a weight efficient insulation/structure design that also allows for the reduction or removal of other shielding methods from the plane such as wire shielding and line replaceable unit filter assemblies.

The systems and methods described herein are sometimes described in the context of an aircraft. Such systems and methods, however, are not limited to practice in connection with just aircraft and can be used in connection with any aircraft or vehicle. As used herein, the term aircraft refers to airplanes, helicopters, missiles, and any object capable of flight. Furthermore, the term vehicle refers to any object capable of mobility, including automobiles, ships, tanks, trucks, and locomotives.

While the invention has been described in terms of various specific embodiments, those skilled in the art will recognize that the invention can be practiced with modification within the spirit and scope of the claims.

What is claimed is:

1. A method of manufacturing a multifunctional shielding mat for an interior of a vehicle, said method comprising:
providing at least one sheet of dampening material;
coupling, using at least one of an adhesive and a fastener, at least one sheet of electromagnetic shielding material to the at least one sheet of dampening material to form the multifunctional shielding mat;
coupling at least one sheet of thermally insulative material to at least one of the at least one sheet of electromagnetic shielding material and the at least one sheet of dampening material;
coupling a layer of flame sensors to at least one of the at least one sheet of dampening material and the at least one sheet of electromagnetic shielding material; and
then configuring the multifunctional shielding mat to cover a predetermined area of the vehicle, wherein configuring the multifunctional shielding mat to cover a predetermined area of the vehicle comprises configuring the multifunctional shielding mat to cover an interior surface of an aircraft fuselage such that a circumference of the fuselage is lined with the layer of flame sensors.

2. A method according to claim 1 wherein coupling at least one sheet of electromagnetic shielding material to the at least one sheet of dampening material comprises coupling at least one sheet of material configured to at least one of absorb electromagnetic radiation and shield the interior of the vehicle from electromagnetic radiation to the at least one sheet of dampening material.

3. A method according to claim 1 wherein coupling at least one sheet of electromagnetic shielding material comprises coupling at least one sheet of metallic material to the at least one sheet of dampening material.

4. A method according to claim 1 further comprising coupling at least one sheet of high frequency electromagnetic shield material to at least one of the at least one sheet of electromagnetic shielding material and the at least one sheet of dampening material.

5. A method according to claim 1 wherein configuring the multifunctional shielding mat to cover a predetermined area of a vehicle comprises at least one of the following: orienting the multifunctional shielding mat on a roll having a width substantially equal to a width of the predetermined area of the vehicle, and providing the multifunctional shielding mat with an adhesive layer configured to adhesively couple the multifunctional shielding mat to the predetermined area of the vehicle.

6. A method according to claim 1, wherein providing the at least one sheet of dampening material comprises providing at least one of the following: a sheet of vibration dampening material and a sheet of sound dampening material.

7. A method according to claim 1, wherein coupling at least one sheet of electromagnetic shielding material to the at least one sheet of dampening material comprises coupling at least one sheet formed from a plurality of woven magnetic wires to the at least one sheet of dampening material.

8. A method according to claim 1, wherein the at least one sheet of dampening material comprises an adhesive layer that facilitates coupling the multifunctional mat to an interior surface of the vehicle, said method further comprising impregnating the adhesive layer with particulates having a shielding effect.

9. A method of shielding an interior of a vehicle from at least one of electromagnetic radiation and vibration, said method comprising:
   providing at least one sheet of vibration dampening material;
   coupling, using at least one of an adhesive and a fastener, at least one sheet of electromagnetic shielding material to the at least one sheet of vibration dampening material to form a multifunctional mat;
   coupling a layer of flame sensors to at least one of the at least one sheet of dampening material and the at least one sheet of electromagnetic shielding material, and
   then coupling the multifunctional mat to a predetermined area of the vehicle, wherein coupling the multifunctional mat to a predetermined area of the vehicle comprises coupling the multifunctional mat to an interior surface of an aircraft fuselage such that a circumference of the fuselage is lined with the layer of flame sensors.

10. A method according to claim 9, wherein the multifunctional mat is a first multifunctional mat having a first thickness and a first level of shielding, said method further comprising:
   positioning the first multifunctional mat near a plurality of windows of the vehicle; and
   positioning a second multifunctional mat having a second thickness and a second level of shielding in an overhead area of the vehicle, wherein the second thickness is less than the first thickness, and the second level of shielding is less than the first level of shielding.

* * * * *